United States Patent [19]

Goodloe

[11] Patent Number: 4,771,858
[45] Date of Patent: Sep. 20, 1988

[54] SHEAR WAVE VIBRATOR VEHICLE ISOLATION SYSTEM

[75] Inventor: Kent J. Goodloe, Sugarland, Tex.

[73] Assignee: Western Atlas International, Inc., Houston, Tex.

[21] Appl. No.: 104,836

[22] Filed: Oct. 5, 1987

Related U.S. Application Data

[63] Continuation of Ser. No. 768,469, Aug. 22, 1985, abandoned.

[51] Int. Cl.$^4$ .............................................. G01V 1/04
[52] U.S. Cl. ..................... 181/114; 181/401; 367/75; 367/189; 248/638; 267/141.2
[58] Field of Search .............. 181/113, 114, 119, 120, 181/121, 401; 367/143, 189, 190, 75; 73/663, 665, 666; 267/63 A, 141.2, 141.3, 141.7, 153; 180/902; 248/559, 638; 254/93 HP, 89 H; 188/379

[56] References Cited

U.S. PATENT DOCUMENTS

| | | | |
|---|---|---|---|
| 3,024,861 | 3/1962 | Clynch | 367/189 |
| 3,159,232 | 12/1964 | Fair | 367/189 |
| 3,291,249 | 12/1966 | Bays | 181/114 |
| 3,353,772 | 11/1967 | Fair et al. | 181/114 |
| 3,372,770 | 3/1968 | Clynch | 367/189 |
| 3,690,402 | 9/1972 | Stafford | 181/5 |
| 3,929,206 | 12/1975 | Bedenbender et al. | 181/114 |
| 4,008,784 | 2/1977 | Bays | 181/114 |
| 4,108,270 | 8/1978 | Mifsud | 181/114 |
| 4,114,722 | 9/1978 | Weber et al. | 181/114 |
| 4,133,409 | 1/1979 | Mifsud et al. | 181/114 |
| 4,135,598 | 1/1979 | Stafford | 181/114 |
| 4,143,736 | 3/1979 | Fair | 181/75 |

FOREIGN PATENT DOCUMENTS

| | | | |
|---|---|---|---|
| 1092441 | 9/1979 | U.S.S.R. | |
| 1133569 | 1/1985 | U.S.S.R. | 367/189 |
| 2025052 | 1/1980 | United Kingdom | 181/114 |

Primary Examiner—Brian S. Steinberger
Attorney, Agent, or Firm—Robert E. Lowe; E. Eugene Thigpen

[57] ABSTRACT

Two tracks are mounted between a vibratory source of shear, or horizontally travelling, wave siesmic energy and its transport vehicle. The tracks are parallel to each other in the direction of horizontal movement of the source when vibrating. One track is attached to the source, and the other to the vehicle. Pressurized rounded resilient members, which may be either spherical bags or wide tires, are mounted between the tracks to isolate the vehicle from vibrations, insuring that the seismic energy enters the earth.

18 Claims, 2 Drawing Sheets

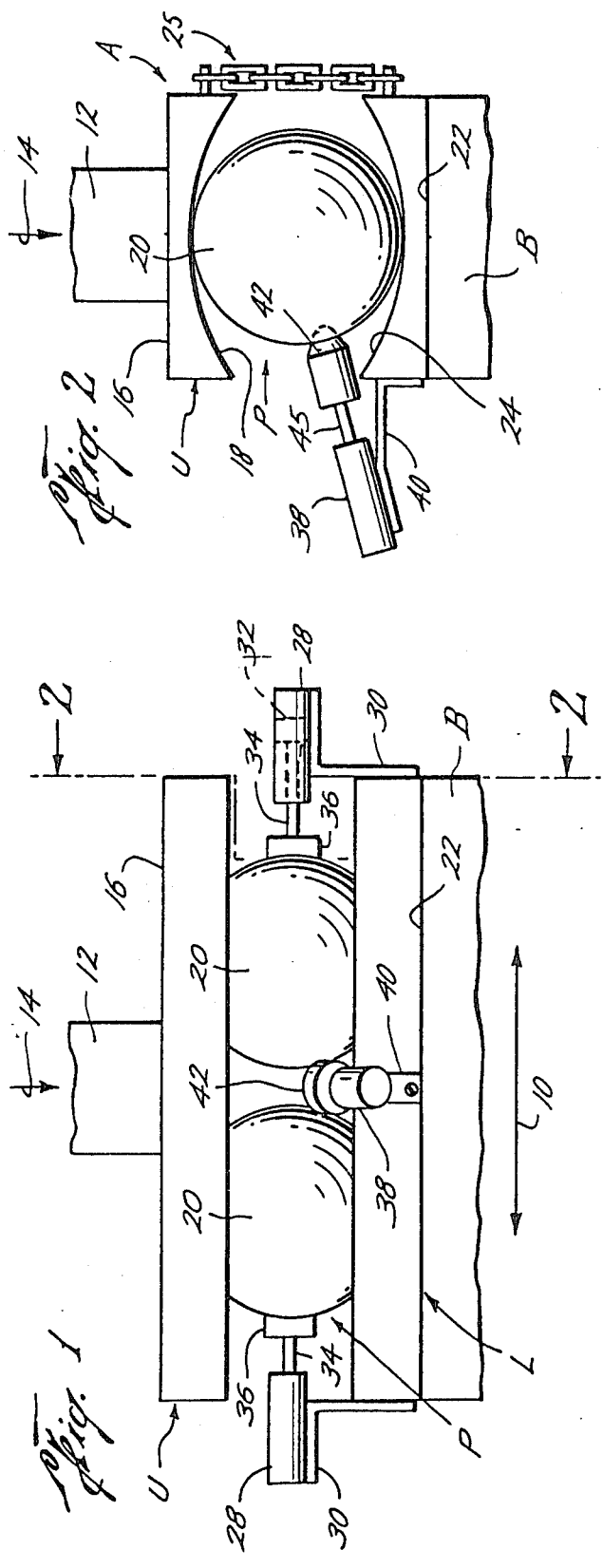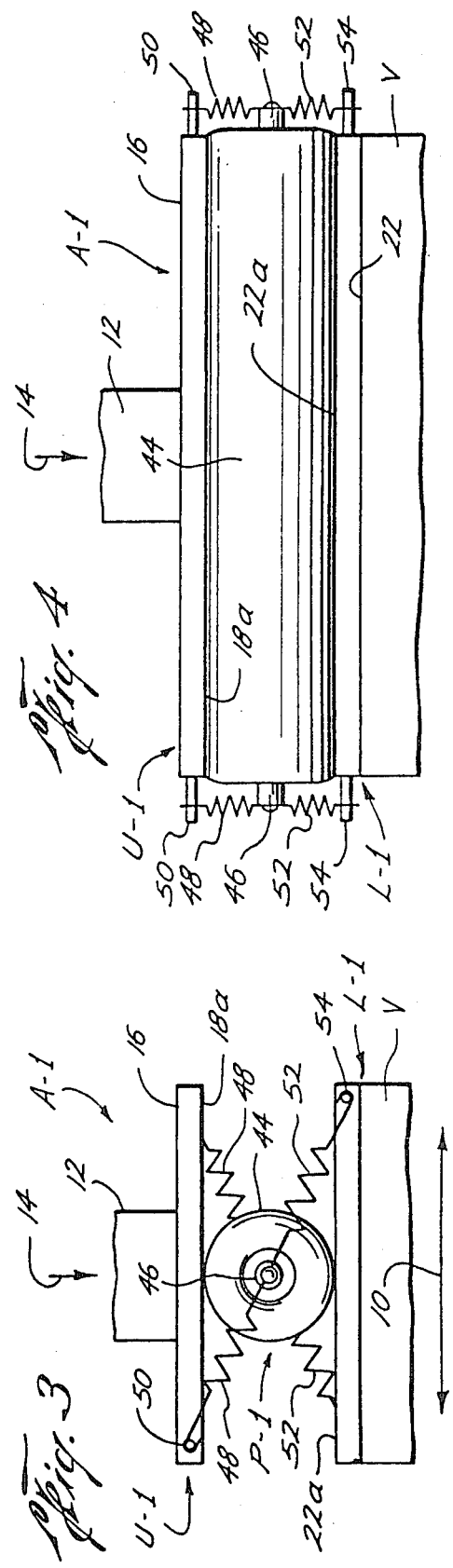

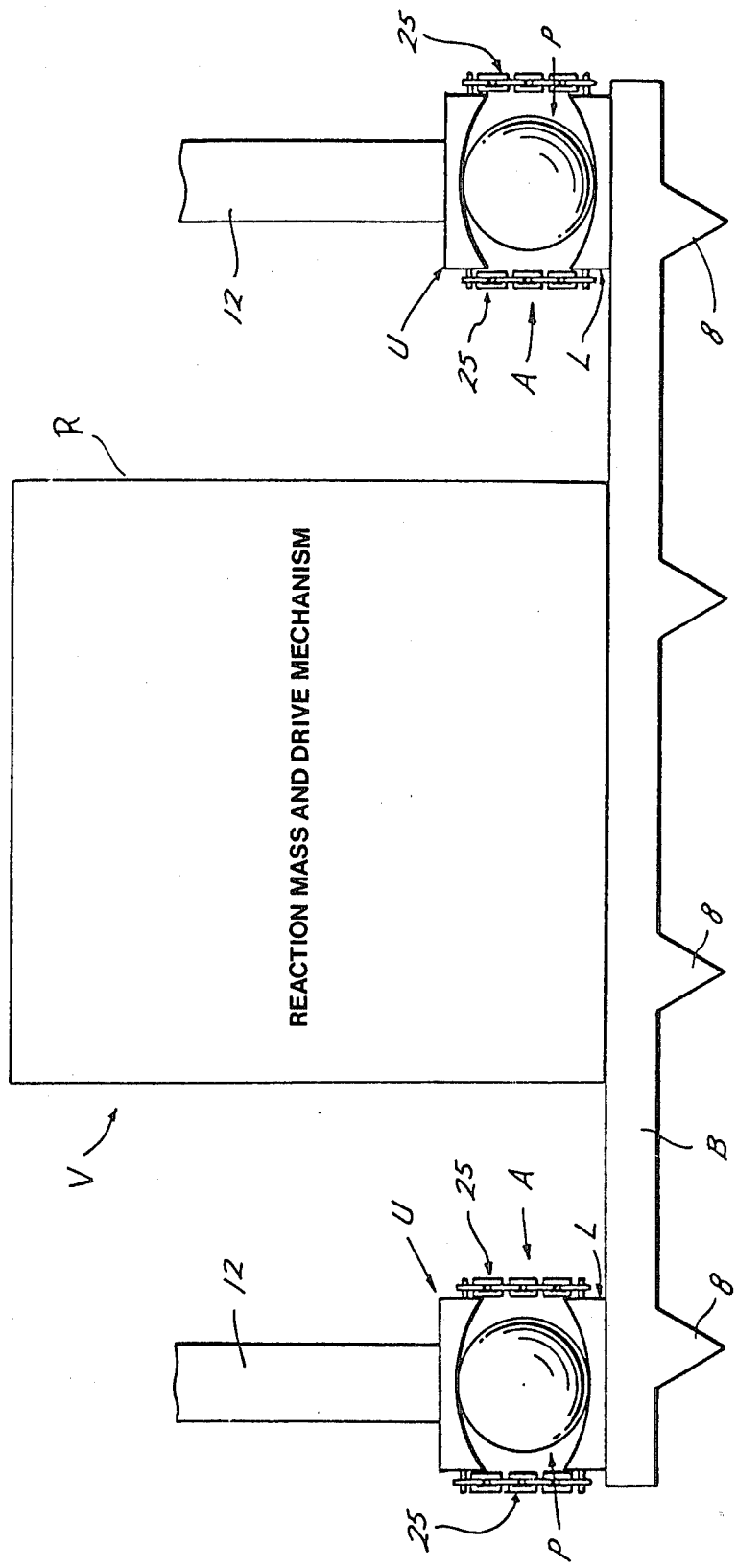

SHEAR WAVE VIBRATOR VEHICLE ISOLATION SYSTEM

This application is a continuation of application Ser. No. 768,469, filed Aug. 22, 1985, now abandoned.

BACKGROUND OF INVENTION

1. Field of Invention: The present invention relates to isolating the energy generated by shear wave seismic vibrators from their transport vehicles.

2. Description of Prior Art:

Prior art seismic shear wave vibrators have been used to impart energy to the earth by a horizontally vibrating mechanism reacting against a baseplate firmly coupled to the earth. The equal and opposite reaction of the baseplate is transmitted to the earth to form shear waves for exploration. So far as is known, these shear wave vibrators requird that their transporting vehicle apply a portion of its weight as a compressive, or hold-down, force to the base plate during seismic operations. The application of this hold-down force was used to help to improve the coupling of the baseplate to the earth. An example of this type of system is set forth in U.S. Pat. No. 4,143,736.

In these systems, however, the hold-down force was applied to the top of the baseplate in a vertical direction. Typically, air bags were attached extending vertically at their opposite ends between the transporting vehicle and the baseplate in an attempt to isolate the vertical compressive force from the horizontal vibration. However, as the baseplate vibrated horizontally, the air bags were subjected to shear forces. Since the air bags were mounted vertically, their primary compliant direction was in the vertical plane and there was limited compliance of the air bags in the horizontal direction. The resultant horizontal shearing action on the air bags during vibration was detrimental to their service life. It was also a difficult and involved process to remove and replace these air bags when they failed due to shearing forces.

SUMMARY OF THE INVENTION

Briefly, the present invention provides a new and improved apparatus for transferring vertical compressive forces, commonly known in the industry as hold-down forces, from a transporting vehicle to the baseplate of a shear wave vibrating seismic source while isolating horizontal vibrations of the seismic source from the vehicle. A resilient pressurized member, either in the form of at least one spherical pressurized bag, inflated tire, or other rolingly compliant member is mounted at an upper portion thereof to the vehicle and at a lower portion thereof to the seismic source. In either bag or tire form, the resilient pressurized member is substantially circular in cross-section in a vertical plane in the direction of horizontal vibration of the seismic source. The present invention thus permits transfer of vertical compressive forces from the vehicle to the baseplate while isolating horizontal vibrations from the vehicle. This makes the transfer of shear wave seismic energy into the ground from the seismic source more efficient. It also provides an isolation system which has an increased service life span and which can be simply and easily replaced.

BRIEF DESCRIPTION OF THE DRAWINGS

FIG. 1 is a side view of an apparatus of the present invention;

FIG. 2 is cross-sectional view taken along the line 2—2 of FIG. 1;

FIG. 3 is a side view of another embodiment of the present invention;

FIG. 4 is an end view of the apparatus of FIG. 3; and

FIG. 5 is an elevation view of an apparatus according to the present invention.

DESCRIPTION OF PREFERRED EMBODIMENT

In the drawings, the letter A (FIGS. 1, 2 and 5) designates generally an apparatus according to the present invention for transferring vertical compressive forces, commonly known in the industry as hold-down forces, from a transporting vehicle to a shear wave vibratory seismic source indicated schematically at V. The shear wave vibratory seismic source V may be of any conventional, suitable type having a reaction mass and drive mechanism R (FIG. 5) which is thus indicated schematically. As is conventional, the drive mechanism moves the reaction mass relative to the baseplate B of the seismic source V and introduces horizontally travelling shear waves of seismic energy into the earth. The shear waves travel in a plane perpendicular to the plane of FIG. 5, in a horizontal direction indicated by an arrow 10 (FIG. 1). Typically, the vibratory mechanism V generates swept frequency vibratory seismic signals. Typically, the reaction mass oscillates with amplitudes of up to two or more inches. The base plate B is usually provided with cleats or teeth 8 (FIG. 5) which penetrate the earth surface for ground coupling purposes. Thus, the base plate B, if well coupled to the ground, moves very little. The efficiency of energy transmission into the earth is inversely related to the relative motion between the earth and the baseplate.

The vibrator V is kept at a raised position on the vehicle out of contact with the ground as the vehicle moves between survey locations, as well as between successive shotpoints or seismic source locations in a particular survey. When the vehicle reaches a specified shotpoint, the vibrator V is then lowered from the vehicle to a ground contact position. The vibrator V is moved between the raised and lowered position by a suitable raising and lifting mechanism of the type known in the art (not shown). The raising and lifting mechanism is connected to the apparatus A by a stilt leg connector member 12, usually one on each side of reaction mass R (FIG. 5), and supports the weight of the vibrator V in the raised postion. Since the lifting mechanism is conventional, the remaining portions of it are not shown in the drawings in order to more clearly see the structure of apparatus A.

To insure adequate coupling in between the vibratory mechanism V and the earth's surface during exploration operations, it has been typical for the transporting vehicle to apply at least a portion of its weight as a hold-down or compressive force which is indicated schematically as an arrow 14 in the drawings.

A suitable conventional centering mechanism (not shown) is also provided to insure that the vibrator V is maintained centrally located beneath the transporting vehicle while the vibrator V is lowered to the ground. Similarly, a conventional mechanism is utilized to prevent the transporting vehicle from shifting laterally when the hold-down force is applied. These are not shown in the drawings so that the structure of the apparatus A may be more clearly seen. Presently, horizontally mounted air bags are provided to center the vibrator as it is lowered. The vehicle's lateral position is maintained by maintaining all of the road contacting transport tires of the vehicle in contact with the ground when the hold-down weight is applied. It should be understood, however, that other centering and stabilizing mechanisms could be used as well.

Turning now to the apparatus A, an upper mounting assembly or track U is mounted at an upper surface 16 to the connector member 12. Mounted beneath a lower surface 18 of the upper mounting assembly U is at least one resilient pressurized member P, which in the embodiment of apparatus A takes the form of spherical bags 20 formed from rubber or other resilient material of a suitable thickness and strength and containing pressurized gas. The pressurized gas is typically air at a pressure adequate to support the amount of hold-down force transferred to the apparatus A through the connector member 12. The lower surface 18 (FIG. 2) of the upper support assembly U takes the form of a lower arcuate surface along its length when spherical bags 20 are used. The arcuate surface 18 conforms laterally across its width to the curvature of the spherical pressurized bag 20 over a surface area adequate to support and transfer the hold-down forces through the apparatus A to the vibrator V.

Typically, depending upon load requirements, a plurality of spherical pressurized air bags 20 are mounted below the upper support assembly U and above a lower support assembly or track L which is mounted on a lower surface 22 to the vibrator V. When plural pressurized air bags 20 are used, they are aligned between the upper and lower mounting assemblies in the direction 10 of the axis of horizontal vibration. An upper surface 24 (FIG. 2) of the lower support assembly L is also formed to have an arcuate surface along its length conforming across its width to the curvature of the spherical pressurized bags 20 over a surface area determined by load requirements.

The upper mounting assembly U and the lower mounting assembly L are interconnected about their outer sides with each other by a number of peripherally located chains or other relatively movable connector mechanisms 25, so that the mounting assemblies may be moved relative to each other. Only one of the chains 25 is shown in FIG. 2 so that other structure of the apparatus A may be more clearly seen. When the vibrator V is raised, the mounting assemblies U and L are moved slightly away from each other so that the spherical air bags 20 are relatively freely movable between the mounting assemblies to reduce wear and possible damage. When the vibrator V is lowered into the ground contact position, the upper mounting assembly U and the lower mounting assembly L are moved towards each other a sufficient distance to immobilize pressurized bags 20 once they have been properly positioned, also exerting a compressive force on the bags 20.

A positioning air cylinder 28 is mounted with a bracket 30 or other suitable mechanism to either the vibrator V or the bottom track L at each end of the apparatus A. The positioning cylinders 28 includes a pneumatic or hydraulic piston 32 therein connected to a piston rod 34 and bag contact plate 36. The bag contact plate 36 is movable from a bag contact position shown in the drawings to a retracted position out of contact with the bag P. The positioning cylinders 28 move the contact plates 36 associated therewith to engage the air bags 20 and move them into proper positions between the upper track U and the lower track L before the tracks U and L are moved towards each other when seismic exploration operations are to take place.

A separating air cylinder 38 is included in the apparatus A when more than one spherical air bag 20 is used. The separating air cylinder 38 is mounted to the vibrator V or the lower track L by a suitable mechanism such as a bracket 40. The cylinder 38 is either pneumatically or hydraulically driven, moving a wedge member 42 mounted at an outer end of a piston rod 45 inwardly and outwardly with respect to a gap between adjacent spherical air bags 20. When the vehicle is transporting the vibrator V and apparatus A to a position for seismic exploration operations, the separating cylinder 38 receives pressure causing the piston rod 44 to move wedge 42 to move into the gap between adjacent air bags 20 to prevent them from chafing and possible damage due to contact with each other. The separating air cylinder 38 and the positioning air cylinders 28 are not shown in FIG. 5, so that the chains 25 may be more clearly seen.

When the vehicle reaches the desired location for seismic exploration operations, the positioning cylinders 28 are pressurized, extending contact plates 36 into contact with the bags 20 and thereafter moving the air bags 20 into the desired position between plate assemblies U and L for isolating the vibrator V from the vehicle. The upper track U and vehicle attachment 12 are then moved downwardly until the air bags 20 are immobilized. At this time, the positioning cylinders 28 and the separating cylinder 38 are caused to move in reverse from their holding positions and to retract from contact with the bags P. Then the hold-down or compressive force is applied from the transporting vehicle through the connector member 12 and the bags P of apparatus A to the vibrator V.

It is to be noted in the apparatus A that the resilient pressurized air bags 20 are substantially circular in cross section in a vertical plane in the direction 10 of horizontal vibration of the vibratory seismic source V, as well as in a vertical plane transverse to the direction 10. These planes also represent the planes in which vertical compressive loads are transferred from the vehicle to the source V. The pressurized air bags 20 are circular in cross section in these vertical planes permitting optimum transfer of the vertically imposed hold-down force from the vehicle to the vibratory source V. The pressurized air bags 20 thus provides rollingly compliant isolation between the vehicle and baseplate B. Further, one of the primary compliant directions of the pressurized air bags 20 is that of their circular cross-section in the direction 10 of horizontal vibration. This feature permits the resilient materials of the bags 20 to absorb any horizontal shear forces which might be transferred upwardly from the vibratory source V.

In a second embodiment A-1 of the present invention (FIGS. 3 and 4), like structure to the apparatus A bears like reference numerals. In apparatus A-1, an upper mounting track or plate assembly U-1 takes the form of a plate member mounted at an upper surface 16 with connector member 12 and having a lower substantially flat contact surface 18a beneath which is mounted a resilient pressurized member P-1. The pressurized member P-1 takes the form of a pneumatic tire 44, usually of considerable width for lateral stability purposes, mounted on an axle 46 extending in a direction perpendicular to the axis 10 of horizontal vibration of the seismic source V. Thus, the rolling axis of the inflated tire 44 is perpendicular to the axis of horizontal vibration, indicated by the arrow 10, of the seismic source V.

A lower mounting track or plate assembly L-1 of the apparatus A-1 is mounted along a lower surface 22 to the vibrator V and has a flat upper contact surface 22a which receives the pressurized tire 44. Positioning springs 48 extend at each end of axle 46 between the axle 46 and attachment pegs 50 mounted on opposite sides and at opposite ends of upper mounting plate U-1. Similarly, positioning springs 52 are mounted at each end of axle 46 between the axle 46 and attachment pegs 54 on opposite sides and at opposite ends of the lower plate L-1. The springs 48 and 52 serve to center the tire 44 in position between the support plates U-1 and L-1. The springs 48 and 52 also serve to reposition the rolling axis of the axle 46 of the tire 44 perpendicular to the vibration displacement indicated by the arrow 10 when in a lifted position between sweeps. If desired, additional similar springs could be attached to the axle 46 and extend to attachment pegs at each end on each side of the plates U-1 and L-1. Although springs 48 and 52 are shown in the preferred embodiment, it should be understood that other suitable resilient mechanisms, such as pressurized cylinders, could be equally as well used according to the present invention.

It is again to be noted that in the apparatus A-1 the pressurized tire 44 is also circular in cross-section in the vertical plane along the direction 10 of horizontal vibration of the vibrator V, providing rolling compliant isolation between the vehicle and baseplate B. As was the case in the apparatus A, this feature of the present invention permits optimum transfer of vertical compressive forces from the vehicle to vibrator V, while permitting the resilient material of the tire to absorb any horizontal shear forces which might be transmitted upwardly from the vibrator V.

The foregoing disclosure and description of the invention are illustrative and explanatory thereof, and various changes in the size, shape and materials, as well as in the details of the illustrated construction may be made without departing from the spirit of the invention.

I claim:

1. An apparatus for transferring vertical compressive forces from a transport vehicle to a shear vibratory seismic source base plate while isolating horizontal vibrations emitted by the seismic source base plate from the vehicle comprising:
    (a) an upper mounting means;
    (b) a lower mounting means;
    (c) a resilient means interposed between said upper mounting means and said lower mounting means; and wherein said upper mounting means is coupled to said transport vehicle to transfer said vertical compressive forces from said transport vehicle to said resilient means and said lower mounting means is coupled to said base plate to transfer said vertical compressive forces to said base plate from said resilient means, and said resilient means is substantially circular in cross-section in a vertical plane in the direction of horizontal vibration of the seismic source base plate, said upper mounting means having a lower surface in rolling engagement with said resilient means and said lower mounting means having an upper surface in rolling engagement with said resilient means to thereby transfer vertical compressive forces from the vehicle to the seismic source base plate while isolating horizontal movement of the source from the vehicle.

2. The apparatus of claim 1, wherein:
    said resilient means is pressurized.

3. The apparatus of claim 2 further including:
    means for centering said resilient pressurized means between said upper and lower mounting means.

4. The apparatus of claim 3, wherein said upper mounting means comprises:
    an upper mounting track;
    said upper mounting track having an upper surface adapted to be mounted to the vehicle; and
    said upper mounting track having a lower arcuate surface conforming to the curvature of said substantially circular resilient pressurized means.

5. The apparatus of claim 3, wherein said lower mounting means comprises:
    a lower mounting track;
    said lower mounting track having a lower surface adapted to be mounted to the seismic source base plate; and
    said lower mounting track having an upper arcuate surface conforming to the curvature of said substantially circular resilient pressurized means.

6. The apparatus of claim 1, wherein:
    said upper and lower mounting means are movable with respect to each other.

7. The apparatus of claim 6, wherein:
    said upper and lower mounting means are movable to a spaced position allowing said resilient pressurized means to move freely therein when no compressive force is applied from the vehicle.

8. The apparatus of claim 6, wherein:
    said upper and lower mounting means are movable to a compressing position compressing said resilient pessurized means.

9. The apparatus of claim 1, wherein said resilient means comprises:
    at least one spherical pressurized bag.

10. The apparatus of claim 9, wherein said resilient means comprises:
    a plurality of spherical pressurized bags.

11. The apparatus of claim 10 further including:
    means for maintaining said plurality of spherical pressurized bags out of contact with each other when said upper and lower mounting means are in the spaced position.

12. The apparatus of claim 10, further including:
    means for centering said spherical pressurized bags between said upper and lower mounting means.

13. The apparatus of claim 9, wherein:
    said plurality of spherical pressurized bags are aligned between said upper and lower mounting means in the direction of the axis of horizontal vibration.

14. The apparatus of claim 1, wherein said resilient pressurized means comprises:
    an inflated tire having its rolling axis perpendicular to the axis of horizontal vibration of the seismic source base plate.

15. The apparatus of claim 14 wherein said upper mounting means comprises:
    an upper mounting plate;
    said upper mounting plate having an upper surface adapted to be mounted to the vehicle; and
    said upper mounting plate having a lower contact surface for contacting said inflated tire.

16. The apparatus of claim 14, wherein said lower mounting means comprises:

a lower mounting plate;

said lower mounting plate having a lower surface adapted to be mounted to the seismic source base plate;

said lower mounting plate having an upper contact surface for contacting said inflated tire.

17. The apparatus of claim 14, further including:

means for maintaining the rolling axis of said inflated tire perpendicular to the axis of horizontal vibration of the seismic source base plate.

18. An apparatus for transferring vertical compressive forces from a transport vehicle to a shear wave vibratory seismic source base plate while isolating horizontal vibrations emitted by the seismic source base plate from the vehicle, comprising:

(a) a resilient pressurized means;

(b) upper mounting means for mounting said resilient pressurized means at an upper portion thereof with the vehicle;

(c) lower mounting means for mounting said resilient pressurized means at a lower portion thereof with the seismic source; and (d) said resilient pressurized means being substantially circular in cross-section in a vertical plane in the direction of horizontal vibration of the seismic source said upper mounting means having a lower surface in rolling engagement with said resilient means and said lower mounting means having an upper surface in rolling engagement with said resilient means to thereby transfer vertical compressive forces from the vehicle to the seismic source base plate while isolating horizontal movement of the source from the vehicle

* * * * *